United States Patent [19]

Gerhardt

[11] 4,213,737
[45] Jul. 22, 1980

[54] WIND ENGINE

[76] Inventor: Kyle D. Gerhardt, 4111 S. Yellow Springs Rd., Springfield, Ohio 45506

[21] Appl. No.: 870,229

[22] Filed: Jan. 17, 1978

[51] Int. Cl.$^2$ ............................................. F03D 7/04
[52] U.S. Cl. ................................ 416/41; 416/193 R; 416/237
[58] Field of Search ................ 416/37, 41, DIG. 4, 416/135 A, 126, 121 A, 132 B, 237

[56] References Cited

U.S. PATENT DOCUMENTS

| | | | |
|---|---|---|---|
| 163,734 | 5/1875 | Burrows | 416/139 A X |
| 515,863 | 3/1894 | Forstner | 416/189 A |
| 603,188 | 4/1898 | Hein | 416/136 |
| 1,123,465 | 1/1915 | Artibee | 416/136 |
| 1,713,866 | 5/1929 | D'Asseler | 416/210 X |
| 1,739,866 | 12/1929 | Schuh | 416/121 A X |
| 1,927,944 | 9/1933 | Lysholm | 416/237 X |
| 2,050,142 | 8/1936 | White | 29/156.8 P |
| 3,222,533 | 12/1965 | MacKay | 416/126 X |
| 3,580,694 | 5/1971 | Andersen et al. | 416/136 |

FOREIGN PATENT DOCUMENTS

| | | | |
|---|---|---|---|
| 379292 | 8/1923 | Fed. Rep. of Germany | 416/132 B |
| 845180 | 7/1952 | Fed. Rep. of Germany | 416/9 |
| 534847 | 4/1922 | France | 416/140 |
| 2286952 | 4/1976 | France | 416/126 |
| 2288877 | 5/1976 | France | 416/132 B |

*Primary Examiner*—Everette A. Powell, Jr.

*Attorney, Agent, or Firm*—Jerome P. Bloom

[57] ABSTRACT

Windmill apparatus comprises an open framework defining a wheel having means defining a pivot axis and embodying a plurality of radially and closely spaced concentric rows of air foils. The foils in each row are connected for their conjoint movement to and from a pre-set operating position, within defined limits. The movement of each foil is about an axis which is substantially radial to the wheel and it is arranged to automatically feather when subject to impact of winds the speed of which is at a dangerous level. As oriented in the wheel the radial extremities of each foil are substantially flat and bridged by a continuous peripheral surface portion. One portion of said peripheral surface portion is flatted to define the operating face of the foil. The flatted portion is preferably comprised of two planar surface portions one of which leads the other, having regard for the facing of the foil operating surface into the prevailing wind. The trailing planar surface portion of each foil is angled obliquely and outwardly from its leading planar surface portion. The balance of the peripheral surface of each foil is generally arcuate in profile in a sense transverse to its pivot axis and is so curved as to depart sharply from said flatted portion to give the foil a bulbous configuration to one side. The peak of the curved portion of the peripheral surface of the foil gives a depth to the foil at its location the dimension of which is approximately half that of said flatted portion. This gives each foil a short, stubby appearance.

22 Claims, 16 Drawing Figures

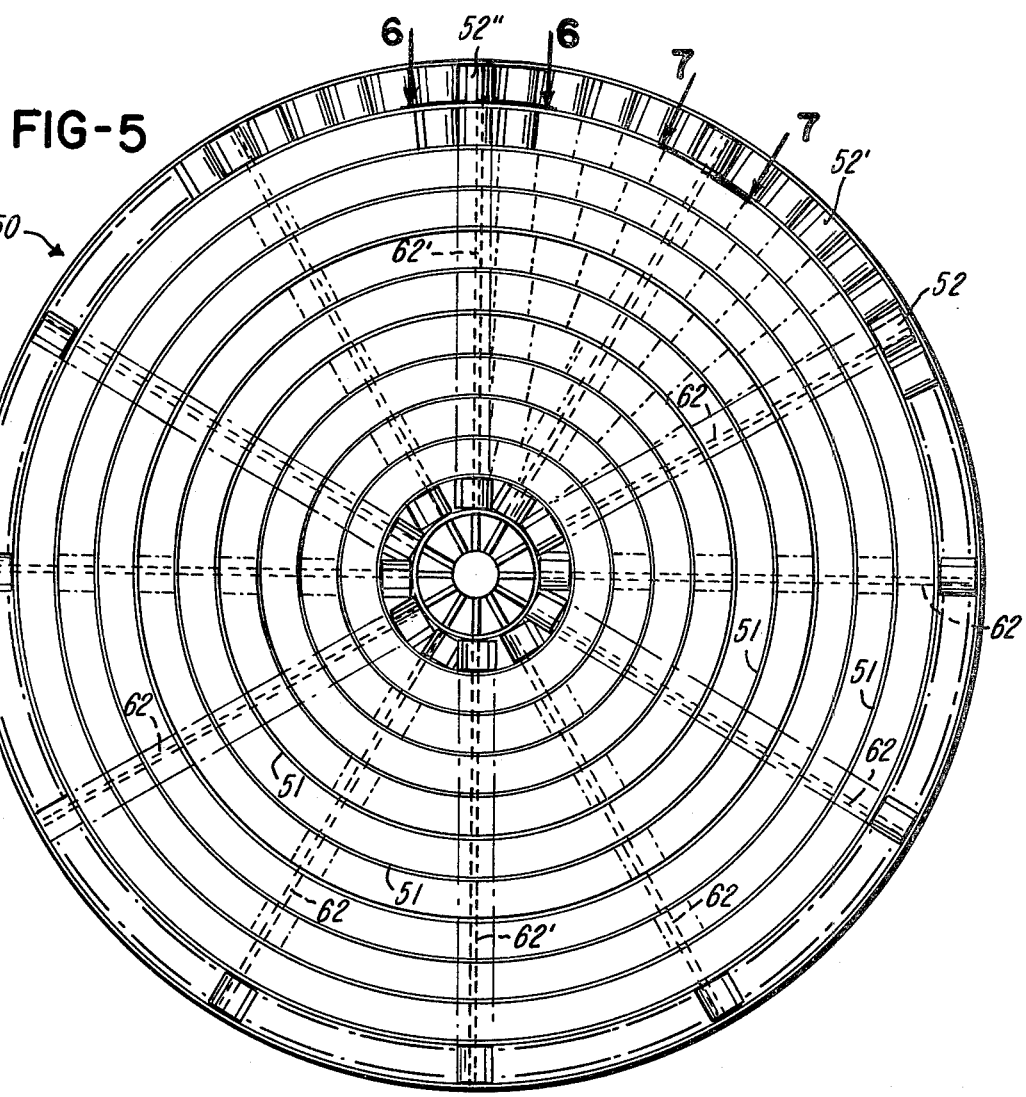
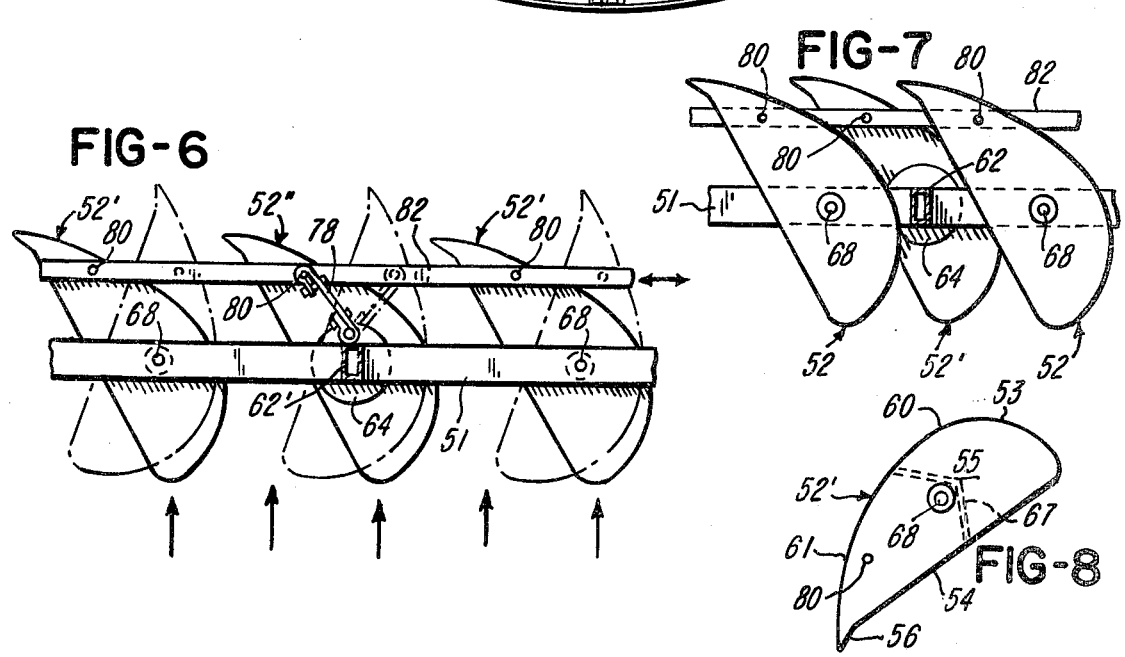

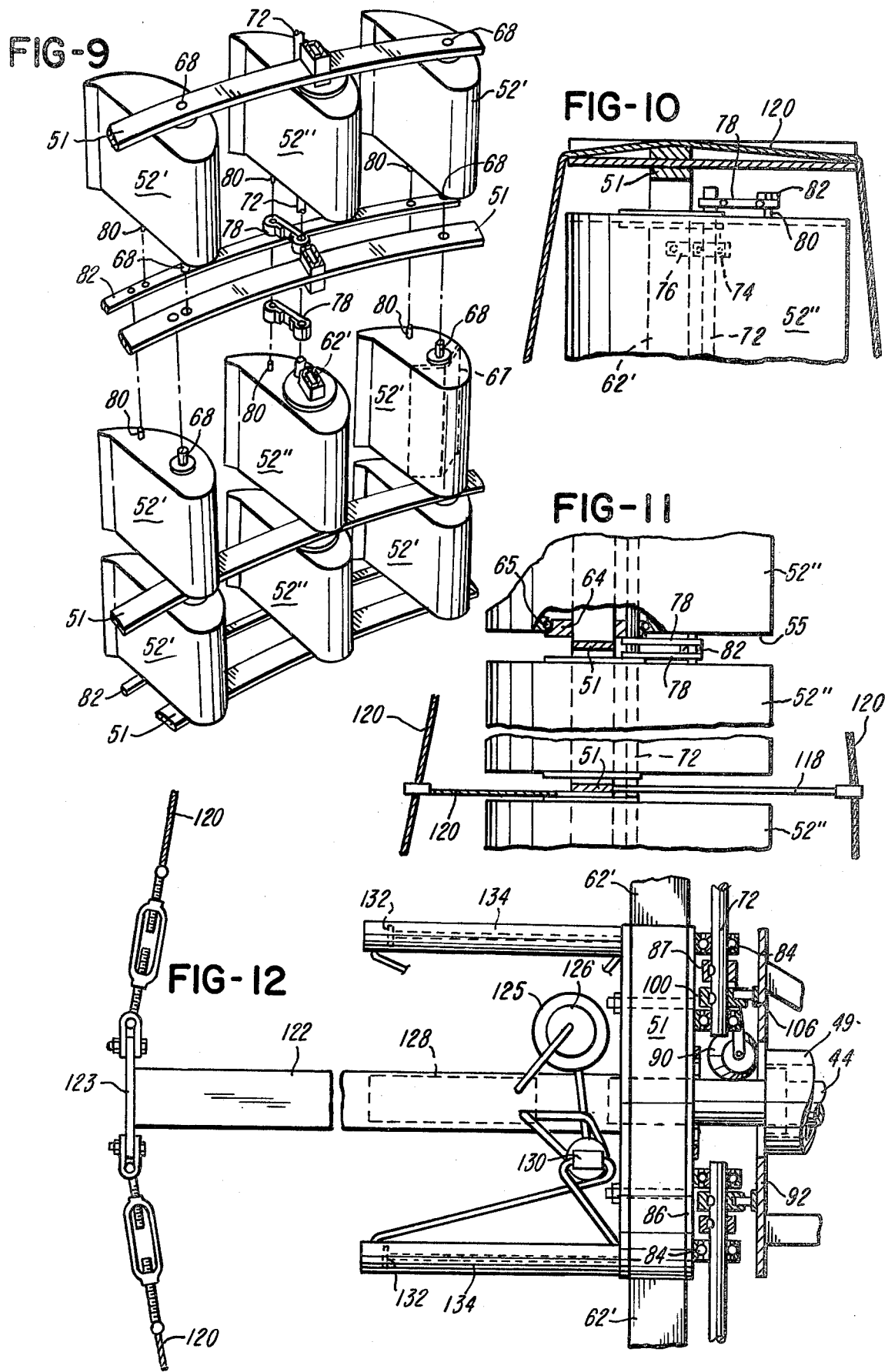

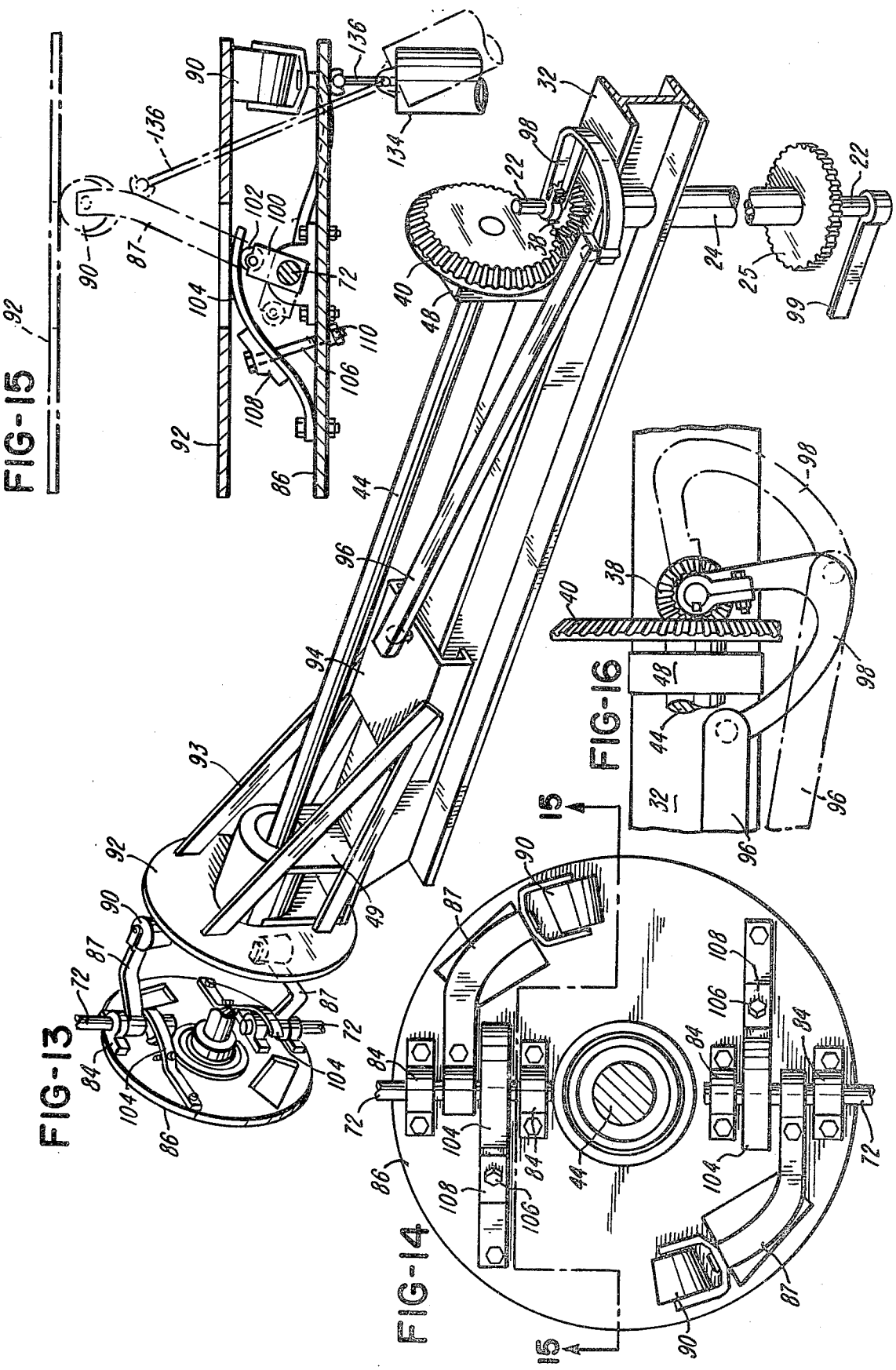

WIND ENGINE

BACKGROUND OF THE INVENTION

This invention relates to a new and improved wind engine capable of effectively and efficiently developing usable electrical energy in the face of a prevailing wind the speed of which is as low as five miles per hour and even less.

The idea of using wind as a source of energy was conceived many many years ago. However, the art in this respect has never developed to any significant extent, particularly in respect to its application to the production of electrical energy. One important reason has been the apparent inability of a wind engine, as heretofore comprised, to effectively function when the prevailing wind speed is relatively low. While many proposals have been made and ventures undertaken in an effort to overcome this particular problem as well as the prevailing low efficiency of known wind engines, these have not met with material success. It was to the solution of the noted problem that the efforts which resulted in the present invention were directed.

SUMMARY OF THE INVENTION

The present invention provides a wind engine which is relatively easy to fabricate, efficient and satisfactory in use, adaptable to a wide variety of applications and unlikely to malfunction.

Embodiments feature a vane in the form of an improved air foil the configuration of which is such to enable its application as a vane segment in a wheel form to produce usable electrical energy in the face of prevailing winds having a speed as low as three to five miles per hour.

Considering its orientation as illustrated in the FIGS. 6, 7 and 8 of the accompanying drawings, the foil of the present invention is shown to have an under surface configuration providing it with a generally flat, planar operating face. In preferred embodiment the operating face is extended at its trailing end by an obliquely and outwardly angled short tail portion. The leading end of the upper surface of the foil is formed as a curve highly peaked adjacent its leading edge which merges in a reverse curve with the leading edge of the foil undersurface, giving the profile of the foil, in a sense transverse to its pivot axis, a bulbous configuration. Rearwardly of its peak the curve of the upper surface of the foil is extended as a continuing curve formed on a much larger radius. The arrangement gives the foil a side profile the ratio of the dimension of the length of the planar operating surface of which in respect to that of its peak height is in the nature of two to one. Accordingly, the foil has a somewhat bulky, stubby look as compared to that of the relatively thin streamlined configuration of a conventional air foil or vane.

In an embodiment illustrating the invention a plurality of the described foils are arranged in concentric rings. In each of the rings the foils are arranged in immediately following relation to one another and mounted by means of pivots which extend in a sense generally radially of the wheel configuration of which they form a part. Cocking means which set the foils condition the foils to feather in the face of a predetermined level of wind speed.

It is a primary object of the invention to provide an improved wind engine, primarily for the purpose of developing electrical energy, which is capable of functioning in this respect at low prevailing wind speeds.

A further object is to provide a new and improved air foil type vane for use in wind engines.

Another object is to provide a unique arrangement of vanes forming a wind driven wheel useful for furnishing motor power to generate electrical energy.

An additional object of the invention is to provide improved safety features in connection with wind engines embodying air foil type vanes which cause the vanes to be safely feathered when prevailing winds reach a predetermined level of speed.

A further object of the invention is to provide a wind engine and component parts thereof possessing the advantageous structural features, the inherent meritorious characteristics and the means and mode of use herein described.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the accompanying drawings wherein is shown one but obviously not necessarily the only form of embodiment of the invention, FIG. 1 views a side elevation of a wind engine illustration according to the present invention, and, in dotted lines, an adjustment of its tower portion to facilitate inspection and maintenance procedures.

FIG. 5 is a generally diagrammatic frontal elevation view of the wind driven wheel wherein only a portion of the included air foils are illustrated.

FIG. 6 is a view taken on line 6—6 of FIG. 5;

FIG. 7 is a view taken on line 7—7 of FIG. 5;

FIG. 8 is a side view of one of the air foils shown in an optimal operating position;

FIG. 9 is an exploded perspective view of a radial segment of the wind wheel to illustrate detail of its foil configuration and the controls and connections by which they are set and by reason of which they conjointly move;

FIG. 10 is a fragmentary view of an outer end portion of the wind wheel taken on a radial line thereof;

FIG. 11 is a view taken similarly to that of FIG. 10 but radially inward thereof;

FIG. 12 illustrates further control detail; and

FIGS. 13–16 are fragmentary views which in their composite illustrate cocking control mechanism embodied in connection with the wind wheel.

Like parts are indicated by similar numerals of reference throughout the drawings.

DESCRIPTION OF THE ILLUSTRATED EMBODIMENT

Figure 1:
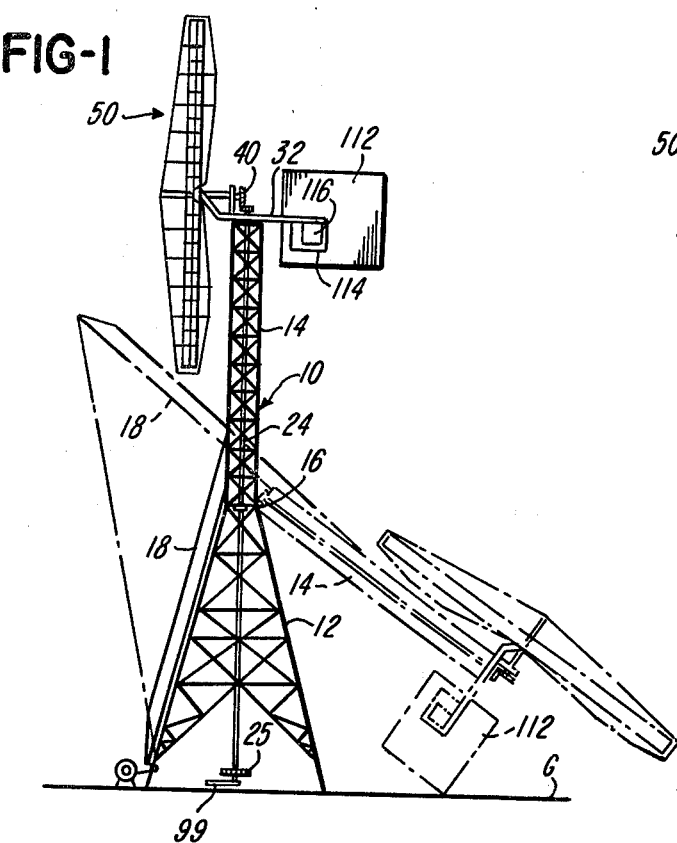
Figure 2:
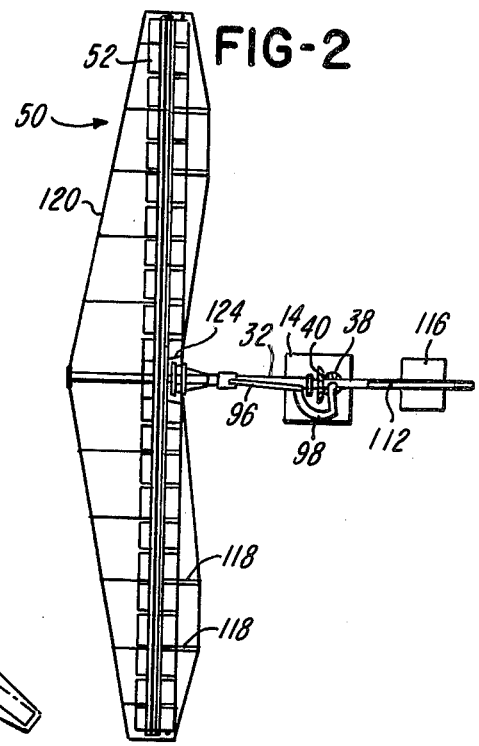
FIG. 2 is a view of the top of the structure of FIG. 1.

The wind engine of FIG. 1 is housed in and mounted on a tower 10 erected to project vertical to a ground surface G. The tower 10 is an open framework comprised of a lower section 12 which has the configuration of a pyramid the apex of which is horizontally truncated and an upper section 14 which has a generally rectangular configuration.

By reason of its pyramidal configuration, the tower section 12 has upwardly convergent front and rear faces each inclined at an angle of approximately 75 degrees to a horizontal at the ground surface G. The upper section 14 is pivotally jointed to the section 12 by a hinge device 16 which interconnects the tower sections at what may be considered their rearmost adjacent edge portions. The section 14 has an extension 18 integrally connected with and angled downwardly and forwardly from the lowermost portion of its front at an angle approximately 15 degrees to a vertical. When the section 14 is superposed on and seated to form a vertical extension of the section 12, the extension 18 abuts the forwardmost face of the section 12.

Extended upwardly of a vertical to the ground surface G, through the center of the tower 10, is a composite shaft structure comprising a cocking shaft 22 located within, spaced from and in concentric relation to a tubular power transmission shaft 24. The lowermost end of the shaft 24 is supported in suitable bearing structure (not shown) and has in fixed relation thereto a gear 25 which may be used to transmit its rotation to a suitable generator, for the production of electrical energy. The apparatus in this respect can be arranged in any one of a number of ways well known to those mechanics versed in the art. Under such circumstances, it appears unnecessary to either further describe or to illustrate such structure, particularly since it does not involve but merely utilizes the improvements of the present invention.

Figure 3:
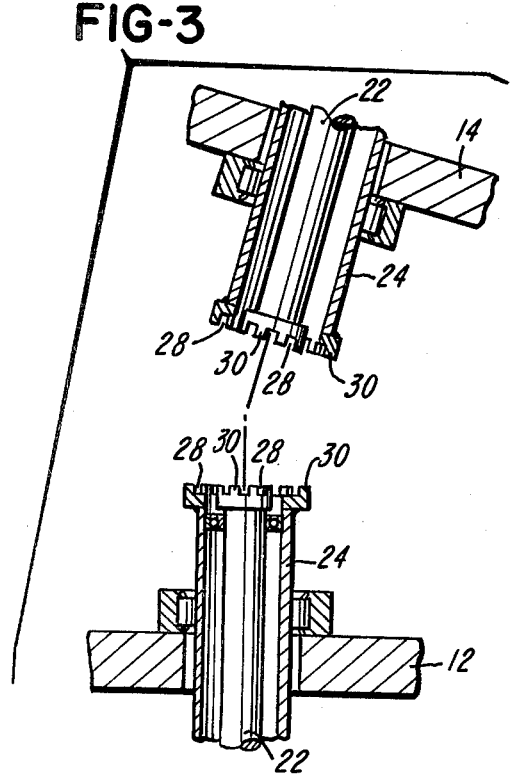
FIG. 3 is a fragmentary enlarged view of a portion of the tower structure which enables the adjustment shown in FIG. 1.
Figure 4:
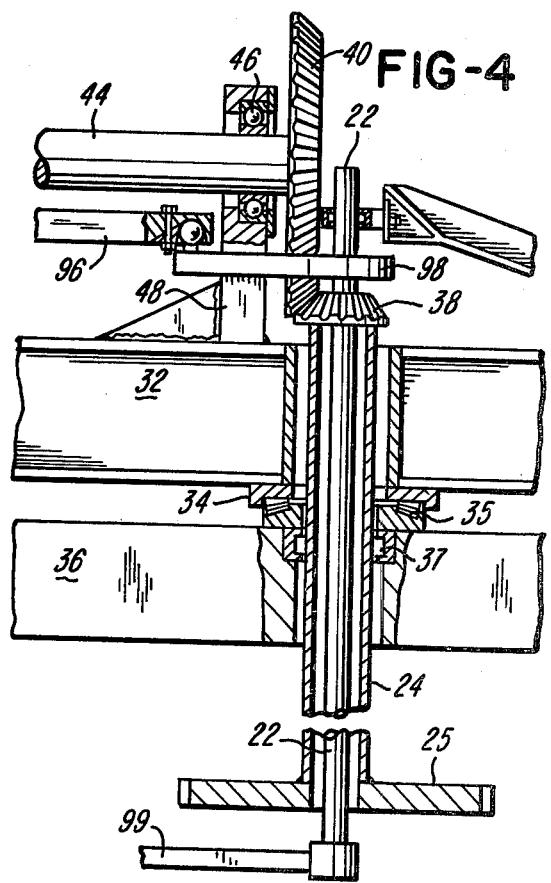
FIG. 4 is a fragmentary enlarged view illustrating mount and control structure and power transmission means for the wind driven wheel supported at the top of the tower structure shown in FIG. 1.

The shaft elements 22 and 24 are suitably spaced and supported to permit their relative rotation. The shaft 24 projects through vertically spaced bearings mounted to vertically spaced plates connected to transversely bridge the frame structure forming the tower 10. Intermediate their vertical extremities and immediately above and adjacent to the uppermost end of the tower section 12 the shafts 22 and 24 are horizontally split to accommodate the pivotal displacement of the tower section 14 in a manner which may be seen with reference to FIGS. 1 and 3 of the drawings. The adjacent end portions of the respective sections of the shafts 22 and 24 defining the split are formed to interfit and permit a driving relation from one section of each shaft to the other when they are vertically and axially aligned and one seated to the other, while accommodating their relative displacement in connection with the displacement of the tower section 14 as and when required. In this respect FIG. 3 shows the adjacent mating ends of the sections of each shaft are each formed with a series of rectangular notches 28 spaced by rectangular fingers 30 of the same width and that the notches and fingers of one thereof are offset from those of the other so the fingers of each interfit in the notches of the other in a manner to insure a driving relation between the shaft sections when they are superposed to be coaxial and to provide that the upper of the shaft sections seats on and is coupled to the lower.

Mounted on and to extend horizontally across the top surface of the tower 10 is a longitudinally extended "I" beam 32. An annular cap plate 34 fixed at the undersurface of the beam 32 aligns with an aperture in the center of the beam to accommodate the projection therethrough, and to and through the beam, of the shafts 22 and 24. The plate 34 caps thrust bearings 35 seated in an annular bearing container fixed to a head plate 36 at the top of the tower 10 in concentric spaced relation to the shaft 24. The head plate 36 also nests a bearing 37 for the shaft 24. By such means the beam 32 is mounted for rotation on and relative to the tower 10.

The top end of the shaft 22 projects above and beyond the top end of shaft 24 and the latter projects above the beam 32. A conical gear 38 fixed on and to the uppermost end of the shaft 24 has the teeth thereof meshed with similarly configured teeth on the periphery of a much larger diameter gear 40. The gear 40 rotates in a vertical plane at one side of the gear 38 and parallel to the longitudinal axis of the shafts 22 and 24. The gear 40 is fixed on and for rotation with the inner end of a horizontally oriented drive shaft 44 which projects through a bearing 46 in a plate-like support 48 fixed to project perpendicular to the upper surface of the beam 32 in an adjacent relation to the upper end of shaft 24. Outwardly of the bearing 46 the shaft 44 passes through a bearing mounted in a plate-like support 49 fixed to project perpendicular to the most adjacent outer end of the upper surface of the beam 32. Just beyond the said outer end of the beam 32, the projected extremity of the shaft 44 mounts a wind driven wheel 50 in fixed relation thereto and for rotation therewith. The wheel 50 occupies a plane parallel to that occupied by the gear 40.

The wheel 50 includes a series of concentrically arranged, radially spaced, relatively narrow ring shaped bands 51 forming a plurality of closely spaced annular openings each of which is occupied by a series of circularly arranged closely following vanes. Each vane mounts on a radially oriented pivot means and comprises a specially configured air foil 52.

Referring to FIGS. 8 and 9 in particular, the in the orientation shown therein, giving the profile of each foil in a sense transverse to its pivot axis foils 52 each have a flat planar undersurface portion 54 essentially the length thereof extended at its trailing end by a short tail portion 56 obliquely and outwardly angled to form therewith an angle in the neighborhood of 160 degrees. The respective lateral sides 55 of each foil are planar in configuration. While in this preferred embodiment the sides 55 provide substantialy flat surfaces which are parallel, in some applications it may be desirable to have them symmetrically angled from their leading to their trailing edges. The other or upper surface of each foil 52 has, in profile, at its leading edge, a curved portion 53 rising sharply upward at its leading edge to rapidly reach a peak 60 at one end which is adjacent but spaced rearwardly of the leading edge and forwardly of the location of the foil pivot. The leading end of the curved portion 53 is extended in a curve formed on a much smaller radius which merges with the leading end of the undersurface portion 54 of the foil. The portion 54 constitutes the operating surface of the foil and is designed to face into the prevailing winds in use thereof. Rearwardly of the peak 60 the upper surface of the foil is smoothly extended on a much flatter curve 61 to form with the undersurface of tail portion 56, which continues the surface portion 54, an acute angle in the neighborhood of 30 degrees.

Fixed internally of and extending from side to side of each foil 52 is a reinforcing plate 67 which is bent on a central transversely extending line thereof to form, in cross section, an angle of about 138 degrees. This plate is positioned so the line on which it is bent is located immediately forward of what constitutes the pivot axis of the foil, and any structure which may extend therethrough. The angularly related relatively adjacent surfaces of the half portions of the plate which define therebetween the 138 degree angle are directed towards the trailing end of the foil and their projected extremities are suitably anchored in connection, respectively, with the foil portion 54 and the foil portion 61 while the lateral extremities of the plate 67 are anchored to the foil sides 55.

The bands 51 are interconnected by twelve radially oriented segments of tubing 62 spaced 30 degrees apart and radially coextensive with the wheel 50. Referring to FIG. 1, two of these tubing segments, identified by the numeral 62', lie on a diameter of the wheel which defines its 6 o'clock and 12 o'clock positions. Each segment 62' has suitably mounted thereon, between each pair of successively adjacent bands 51, a pair of longitudinally spaced, generally parallel, relatively fixed annular plates 64. The outer peripheral edge of each plate 64 is formed to provide an inner race for bearings 65. The plates 64 of each pair respectively dispose in openings provided in each of the outer side plate portions 55 of a foil 52, which openings are rimmed by means defining an outer race for the bearings 65 encircled thereby. The foils 52 so modified mount on and for rotational movement with respect to a pair of plates 64 and about the segment 62' which projects therethrough. The tubing segments 62 at the 2, 4, 8 and 10 o'clock positions on the wheel 50 are similarly identified as 62' and similarly mount annular plates 64 which rotatably mount in turn the foils 52, modified as described, through the medium of interposed bearings 65.

Those tubing segments 62 which are located at 1, 3, 5, 7, 9 and 11 o'clock positions similarly mount foils 52 but only in the areas of the wheel where they pass between the bands 51 defining every other annular opening in the wheel. Where the foils 52 are not located to have tubing 62 pass therethrough, each foil 52, here indicated as 52', merely embodies and mounts in projected relation to each outer side, a pivot pin 68. In each case the pins 68 nest for rotation in a bearing 69 fixed to the adjacent side of a band 51. Thus the pins 68 in connection with each foil 52' defines its pivot axis which is oriented radially of the wheel 50.

It will be seen from the foregoing that there is a single ring of foils between each pair of successively adjacent bands 51 and in each ring each foil is pivotally mounted for movement about an axis which is radial to the wheel 50.

A rod 72 in adjacent parallel relation to the tubing segment 62' which extends from the center of the wheel 50 to a 6 o'clock position and a further rod 72 which similarly parallels the segment 62' which extends to the 12 o'clock position on the wheel forms in each case a control shaft. Each shaft 72 passes through longitudinally spaced bearings 74 fixed in place by straps 76 connected to and projected in a loop form from one side of the adjacent tubing segment 62'. The shafts 72 are fixed against axial movement, coaxially aligned and project through transversely aligned apertures in the annular plates 64 on the adjacent segments 62', on and about which foils 52 are adapted to rotate, as previously described. The shafts 72 are positioned thereby offset to the rear of the pivot axes of the foils 52 through which they project.

The shafts 72 thus bridge foils 52 in a common diametral line of the wheel 50. As so arranged, they connect in an operative relation to two diametrally opposite foils in each circular row or ring thereof. For convenience of description the foils on this diametral line are identified by the numeral 52".

A plurality of strap-like links 78 are fixedly clamped at one end thereof to each shaft 72, one being located at each of a plurality of spaced locations thereon so as to position one thereof adjacent each foil through which the shafts 72 project. The opposite end of link 78 is looped, in each case, about a pin means 80 fixed to and projected out from one side of the adjacent foil 52". The pin means 80 is located in adjacent closely spaced relation to the rear end of the upper curved surface of the foil.

In the construction shown one ring element 82 is included between each two circular rows of foils 52 to position parallel thereto and to extend from foil to foil of each ring at a location adjacent the rearmost or trailing ends of the foils in a line which intersects the line of their pin means 80. In general, with respect to the foils 52" of the paired circular rows between which a ring element 82 is applied, the pin means 80 in connection with these foils project from adjacent facing sides thereof to and through, in each case, the looped adjacent end of the link 78 and these pin means mutually project into the body of the interposed ring element 82 and are commonly coupled thereto. The element 82 is recessed at opposite sides thereof for this purpose. In each row of foils, the rows of which are paired, the other foils 52 and 52' mount projected pin means 80 at one side thereof in a manner similar to the foils 52" and these pin means also extend into apertures or accommodating recesses in the ring element 82 associated with its row. By virtue of this arrangement, the foils of each row are commonly interconnected for movement with and by a ring element 82. Further, by virtue of the interconnection of the shafts 72 with selected foils 52" in each row, on a controlled rotation of the shafts 72 the foils through which they extend may be adjusted as to their orientation and at the same time the connected ring elements 82 are adjusted, as a consequence of which the ring elements in their adjustment adjust all the remaining foils in correspondence with the movement thereof.

To control the rod-like shafts 72, innermost ends thereof are arranged to project through radially spaced bearings 84 mounted on and at respectively diametrically opposite locations on an annular plate 86. Plate 86 is fixed to the one side of the wheel 50 most adjacent the gear 40 and about its center, which is defined by the end of shaft 44 on which the wheel mounts and to which it is suitably fixed. The plate 86 is thereby embodied as part of the root support structure for those portions of the wheel 50 outwardly of its center. Fixed to each shaft 72 in spaced relation to and between its bearings 84 is one end of a cocking arm 87 the outer and relatively projected end of which pivotally mounts, by means of a universal connection, a roller 90. The roller 90 has the shape of a truncated cone the outer surface of which bears, in the uncocked position of the arm 87, on one face of an annular plate 92.

The plate 92, which is positioned parallel to the plate 86, is supported on arms 93 fixed to project outwardly of a cocking cart 94. The cart 94 bridges the transversely disposed upper surface of the "I" beam 32 and includes laterally projecting extremities bent down about and arranged to track on the outer side edges of the upper portion of the beam 32. As so arranged, the cart 94 is movable on and longitudinally of the beam by a rod 96 one end of which is pivotally connected to the cart and the other pivotally connected to the outer end of a curved link 98. The opposite end of the link 98 is clamped for movement with and by the cocking shaft 22. The shaft 22 is rotatable from the ground surface G through the medium of an interconnected radially projected crank rod 99.

On suitable rotation of shaft 22 the link 98 is moved forwardly and out in the direction of the wheel 50 to move cart 94 outwardly on the beam 32 and thereby force plate 92 against the rollers 90. In this process the cocking arms 87 are pushed inwardly of the center of the wheel 50 and into the plate 86, inducing a rotation of the shafts 72 to which they are respectively fixed. The shafts 72 simultaneously crank links 78 and rotate the rings 82 through the medium of pins 80 to pivot all the foils 52 in the wheel 50 to what is considered their normal cocked position. Once this is achieved the shaft 22 is reversely rotated to retract the plate 92, the cart 94 and the associated linkage.

Connected to the inner end of each shaft 72 is a short radially projected arm 100 which moves therewith as it rotates to stress or relieve stress, as the case may be, on a pressure spring 104. The stress is applied through the medium of a roller type cam element 102 mounted on, to one side of, and adjacent the outer end of the arm 100. Each spring 104 is a leaf type spring, one end of which is anchored to the plate 86, so formed as to extend from its anchored end, parallel to the adjacent cocking arm 87, and to curve outwardly of the plate 86, across a chord thereof, and to have its free end present a concave surface which positions over the adjacent roller 102. Applied to the outer surface of each spring 104 at a location spaced outwardly from its anchored end and between it and the adjacent shaft 72 is a plate 108 having an aperture aligned with an aperture in the spring and one in the plate 86. The expanded head of a bolt 106 is arranged to abut the outer surface of each plate 108 and a nut 110 applied to its opposite extremity bears against the surface of the plate 86 most remote from the head of the bolt. As applied, each bolt 106 is established at an acute angle to the plate 86 and serves with its connected nut to apply a predetermined pressure to the interposed spring 104 which urges its outer curved end over and towards the underlying shaft 72 as it presents a concavely curved surface to the cam roller 102 on which it normally bears.

With the cocking arms 87 forced inwardly to the plate 86, the arms 100 are normally established, preferably and in the case illustrated, at an angle of about 15° to a plane perpendicular to the outer face of the plate 86. In this position of the arms 100, each roller 102 is located to a side of this perpendicular plane which is remote from that side at which the related spring 104 is anchored.

The arrangement of the cocking arms and the application of a predetermined bias thereon through the medium of the springs 104 dictates that the cocking arms will remain in a position located adjacent and inwardly of the plate 86 until the wheel 50 rotates under the influence of a prevailing wind the speed of which reaches a predetermined level, for example, about twenty miles per hour. Up to this point the cocking arms will be inhibited from swinging outwardly of the plate 86 under the influence of the bearing relation of the springs 104 on the cam rollers 102. As the speed of the prevailing wind increases above a level of twenty miles per hour, the forces developed on the foils by the wind will induce the foils to rotate towards a feathered position, thereby to gradually reduce the angle which their operating surfaces form with reference to a radial plane perpendicular to the wheel 50. At the same time the foils 52 are operatively connected to the shafts 72 by way of their pins 80, ring elements 82 and links 78 and thereby rotate the shafts to cause the cocking arms 87 to gradually move out from the plate 86 against the influence of the bias thereon. The position and configuration of the projected end of each spring 104 which bears against the rollers 102 will be such that when wind speed reaches a dangerous level, for example thirty-five miles per hour, the cocking arms will have moved outwardly from the plate 86 through an angle which will carry the cam rollers 102 through a position perpendicular to the plate 86 to a surface portion of the related springs beyond which there is no bias thereon, under which condition all of the foils in the wheel 50 move to what is considered a feathered position, about 20° beyond the operating limits of the foils. This disables the wheel to prevent a dangerous high speed rotation thereof under the influence of a prevailing wind the speed of which is at a dangerous level. When the wind speed diminishes to a safe level, the arms 87 are cocked once more, either manually through the medium of a rotation of the shaft 22 or through the medium of automatically functioning means to be further described.

A vertically oriented plate-like wind vane 112 nests, in a central front edge portion thereof, the tail portion of beam 32 which is remote from the wheel 50 and it is fixed to this end portion for movement therewith. The vane 112 has a cutout 114 which is located immediately under the tail end of the beam. A weight 116 serving as a counterbalance for the wheel 50 is suspended from the beam 32 and positioned within and for movement longitudinally of the cutout 114. The weight 116 is suspended by means including brackets mounting tracking rollers which overlap and ride on the lateral extremities of the lower horizontal laterally extended plate portion of the "I" beam 32.

The frame structure of the wind wheel is reinforced by suitable bracing. The bracing structure includes rods 118 the inner ends of which are anchored to the bands 51. The rods 118 project outwardly from and perpendicular to the respective faces of the wheel 50 and their outer ends provide tie points for steel reinforcing cable 120 which extends about and radially of the wind wheel to form a tight web for the wheel frame which helps the wheel to resist damage under the influence of a high wind velocity. As seen in the drawings, a steel pipe 122 projects from a plate covering the outer face of the wheel 50, at its center. Welded to the projected extremity of the pipe 122 is a plate 123 forming a base for attachment of one end of each cable 120. From this plate the cables 120 extend radially to and about the rim at the outer priphery of the wheel and over the rods 118 at the rear face thereof to mutually anchor at the center of the rear face to an anchor device 124. The arrangement of the reinforcing cable and its mounting and bracing structure is not described in further detail since mechanics of the same is well within the comprehension of any mechanic versed in this art, once the mechanic is given the parameters under which the wheel is designed to operate.

The essentials of a system to enable a powered automatic cocking of the foils following a feathering thereof are schematically illustrated in FIG. 12 of the drawings. As shown, they include an electric motor 125 arranged to energize a pump 126 to draw hydraulic fluid from a tank 128 and deliver it, simultaneously, to two hydraulic cylinders 134, by way of a valve 130, to either side of a piston head 132 embodied for reciprocable movement in each cylinder. In the case of each cylinder a piston rod 136 connected to the piston head 132 projects outwardly from the cylinder to have its projected extremity connect with and bearingly relate to a bracket fixed to one of the cocking arms 87, adjacent its outermost end.

Suitable electrical circuitry will be connected to a source of power, such as a battery, at ground level G and by way of the wheel 50 to energize the motor 125, and produce a predetermined setting of the valve 130, in response, for example, to a device arranged to sense the r.p.m. of the wheel 50, which r.p.m. will correspond to the speed of the prevailing wind. In the alternative, a sensing device may be used which directly senses the speed of the prevailing wind. In any case, where the foils 52 are feathered and the speed of the prevailing wind should reduce to a level in which the wheel 50 and the foils 52 may be safely subjected to its impact, the sensing thereof will close a circuit to the motor 125 to drive the pump 126 and direct hydraulic fluid to the piston heads 132 in a manner to induce a retraction of the piston rods 136. A consequence of this action will be a pulling of the cocking arms 87 inwardly to the plate 86, thereby to rotate the shafts 72 in a manner to pivot the foils 52 (which includes foils 52' and 52") to cause them to assume an operating position.

One may add an additional sensing device related to the amount of electrical energy produced and stored by the operation of the wheel. Should the foils have been feathered, for whatever reason, and the sensing device should sense that the amount of energy stored for use is below a predetermined level, then the circuitry will provide that the motor 125 will be likewise automatically energized to function as above described.

The valve 130 which is utilized in the system illustrated will be a conventional valve the control spool of which will be in a neutral position when the motor 125 is not energized. Under such conditions the rods 136 will be permitted to freely move referenced to the cylinders in which they are embodied, in connection with and in correspondence with the movements of the cocking arms to which they connect. As will be obvious, when the foils feather the cocking arms 87 will pivot outwardly of the plate 86 and in the process pull the connected piston rods 136 outwardly of the cylinders of which they form a part. The pivotal mount of the cylinder, in each case, enables the cylinder to accommodate this movement of the rods 136. Reference is made to FIG. 15 of the drawings for details in this respect.

It is to be understood that the circuitry and the electrical connections involved in this last described feature of the invention are not detailed since in and of themselves they can be variously contrived without difficulties, having the benefit of the present disclosure. Moreover, the elements of the controlled system are not detailed since in and of themselves they may each comprise a commercially available conventional unit.

The degree of reverse rotation of the shafts 72 in achieving the feathering of the foils 52 will cause the foils to pivot sufficiently to have their operating surfaces 54 face inwardly at an acute angle to the plane of the wheel 50 and to present the upper curved surface of each foil to the prevailing wind at an angle to provide substantial space for the wind to rush through the wind wheel and between the foils thereof and the wheel will idle at a safe r.p.m. Should the wind reduce to a predetermined safe speed and reaches a predetermined r.p.m., as above described the same will be signaled to the motor 125 to which will then operate to cause the cocking arms to be pulled back into the plate 86 and to rotate the shafts 72 and achieve the required operating or cocked positions of the foils 52. It will be understood of course that this automatically functioning system for moving the cocking arms will have the required parameters built into the same so as to appropriately function at the proper times.

It is to be understood that the respective parts of the described embodiment of the invention have been detailed in the drawings in a more or less diagrammatic and/or schematic fashion for purposes of simplicity of the present disclosure. Such additional construction features as may be selectively employed in an installation such as described are believed obvious and are at the option of the installers. The details which have not been particularly set forth and to the extent that they are within the comprehension of those skilled in the art form no particular part of the installation the disclosure of which is required for the understanding of the present invention.

Once an installation such as above described has been effected, to produce usable electric energy one need only couple the gear 25 to an appropriate generator for drive thereof under the influence of the prevailing winds which are directed against the wheel 50. Depending on the scale of the installation, one could in the alternative connect the gear 25 directly to certain tools, thereby to power the tools for drive thereof under the direct influence of the prevailing winds.

In summary, before commencing the use of the described apparatus the cocking shaft 22 is turned to project the cart 94 by means and in a manner as previously described to move the plate 92 inwardly of and towards the plate 86, in the process of which the arms 87 are cocked and pushed inwardly of the plate 86 at the center of the wheel 50. The cart 94 is then retracted. The shaft 22 then becomes a standby manually controllable device to be used only if necessary. The cocked position of the arms 87 is determined by the positioning of the cam rollers 102 to stress the springs 104. The bias of the springs 104 on the rollers 102 in their overcenter position, first described as being 15° beyond the vertical with respect to the anchored ends of the springs, tends to maintain the arms 87 in the cocked positions to which they are pushed until such time as the prevailing wind speed reaches a predetermined level.

The cocking of the arms 87 rotates the shafts 72 whereby to adjust all of the foils 52 to a prescribed operating position. In a preferred arrangement in accordance with the invention the leading edges of the foils will be angled outwardly from the wheel 50 to cause the operating surface 54 of each thereof to form an angle in the neighborhood of about 35° with a radial plane of the wheel which incorporates the foil pivot axis and extends perpendicular to the wheel. Tests have proven that for optimal operation of the wheel this angle will vary in use of the wheel in the range from about 10° to 35°.

With the foils in the operating position described, it has been determined by test that a wind speed having a level from three to five miles an hour, on impact on the foils, will induce a sufficient rotational movement of the wheel 50 to drive the power transmission shaft 24 (through the medium of the shaft 44 and by way of the gears 40 and 38) to power a generator and produce, in the process, usable electrical energy which may be stored or immediately utilized. The amount of energy developed will be in correspondence with the level of the wind speed and the r.p.m. of the wheel 50. Should the prevailing wind speed to which the wheel 50 is subjected reach a predetermined dangerous level such as thirty-five miles per hour, for which the parts controlling the foils have been pre-set, absent powered controls being applied the wind will induce the foils to feather, as previously described, and cause the cocking arms 87 to pivot outwardly from the wheel and the plate 86 thereof to swing the cam rollers 102 to positions of relative disengagement from the springs 104. The foils 52 and their operating surfaces 54 will now be in positions wherein the prevailing winds will have no direct impact on their surfaces 54. Any significant rotational influence of the wind on the wheel is avoided thereby and the wheel will idle at some speed but within safe limits. Under such conditions the wheel 50 cannot be driven to any extent which might cause consequent damage to the wheel or its related parts under the influence of the forces developed by dangerous wind speeds. This also insured against damage to any associated equipment.

The wind speed sensors and the related powered system employed in connection with the wheel are so arranged as to automatically function in a positive manner to reinstitute a production of energy, as previously described, immediately upon a sensing of a wind speed which is at a reasonably safe level.

Particular advantages lie in the use of a vane in the nature of the novel air foil having the configuration above described. Its relatively short length and the relatively low ratio of its length to its maximum depth as well as its general configuration in profile enables a highly effective means for use in developing an optimal rotational influence on the wheel 50.

In the case illustrated the foils in each row thereof will have their operating surfaces in closely following relation so that they can utilize to a maximum the power inherent in the prevailing winds, even under conditions of a low speed movement thereof. The very short obliquely angled tail portion 56 forming a brief extension of each operating surface 54 is designed to enhance the ability of each foil to retain and take full advantage of impacting air and convert the influence thereof into a rotational influence. The contour of the "upper" surface of the foil, which is that opposite the operating surface, lends further benefits in the efficient development of required positive and negative pressure influences on the foil and thereby on the wheel 50.

Both manually and power controlled equipment have been illustrated for effecting feathering and/or cocking of the foils and the same can be used independently or to supplement each other as needs require.

In summary, the invention provides a wind wheel which is uniquely responsive to low air speeds, thereby enabling a much greater use of a wind wheel as a source of power for developing electrical energy. It is believed that the type of vanes employed and their relationship gives the ability to embodiments of the invention to function with a degree of efficiency and productiveness not heretofore achieved in the art, particularly in as simple a manner as herein set forth.

It is to be understood, of course, that the limits as to the range of speed of the prevailing winds within which it shall be determined that the wheel will operate need not be restricted to an upper limit of 35 miles per hour. This limit will vary in accordance with the environmental conditions in the area in which the wind engine is employed and will be compensated for in the erection of and the parameters provided for the wind engine to operate.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect and the invention is therefore claimed in any of its forms or modifications within the legitimate and valid scope of the appended claims.

The embodiments of the invention in which an exclusive property or privilege is claimed are defined as follows:

1. Windmill apparatus for use in capturing the energy of the wind and converting it to power comprising a plurality of relatively narrow ring-like bands joined together in a generally concentric radially spaced relation to form a wheel adapted to rotate about means defining therefor a central axis, said wheel in use normally orienting generally perpendicular to a ground surface, a plurality of air foils positioned between successively adjacent bands, in a circularly spaced relation, each said air foil having means pivotally mounting it for adjustment about an axis which is radial to the wheel axis, the surfaces of said foils at their radial extremities being substantially flat, each said foil between its radial extremities being provided with an outer peripheral surface a substantial portion of which is flatted to define its operating face which in use of the foil is generally faced into the prevailing wind, the balance of the said peripheral surface being generally arcuate and departing sharply from said flatted portion to give the foil a generally bulbous configuration at its side opposite that defined by said flatted portion the peak of which has a substantial departure from said flatted portion and there being a relatively low ratio of the length of said flatted portion to the depth of said foil at the location of said peak in a sense transverse to the pivot axis of the foil.

2. Windmill apparatus as in claim 1 characterized in that said flatted portion of said peripheral surface of said foil being comprised of a pair of distinct planar surface portions one of which leads the other having regard for the facing of the foil into the prevailing wind in its environment in use, the trailing planar surface portion of said flatted portion of said peripheral surface being angled obliquely and outwardly from said leading planar surface portion thereof.

3. Windmill apparatus as in claim 1 wherein the ratio of the length of said flatted portion of said peripheral surface of said foil to the maximum depth of said foil in a sense transverse to its pivot axis, as defined by said peak, is not appreciably greater than 2 to 1.

4. Windmill apparatus as in claim 2 characterized in that said peripheral surface in transverse section has an angle defined between the end of said trailing planar surface portion of said flatted portion thereof joined by a portion of said generally arcuate peripheral surface portion in a manner to define therewith an angle therebetween in the neighborhood of 30°.

5. Windmill apparatus as in claim 2 characterized in that said trailing planar surface portion of said flatted portion of said foil forms an angle with said leading planar surface portion thereof in the neighborhood of 160°.

6. Windmill apparatus as in claim 1 characterized in that said air foils in each ring thereof have a common connection providing for their conjoint movement under the influence of a prevailing wind to which their operating faces are subjected.

7. Windmill apparatus as in claim 6 wherein means are provided for a selective setting of the operating faces of the foils in each row thereof in a substantially simultaneous fashion to cause their operating faces to be similarly oriented to face a prevailing wind to which said wheel is subjected.

8. Windmill apparatus as in claim 7 wherein said means for setting said air foils substantially simultaneously are constructed and arranged to limit the operating position of the operating face to each said foil so that the operating face of each said foil forms an angle with a radial plane of said wheel which extends through its pivot axis and perpendicular to the plane of the wheel which is not greater than about 35° and not less than about 10°.

9. Windmill apparatus as in claim 1 characterized in that said air foils are pivotally mounted to said bands and portions of the connections therebetween to dispose their pivot axes in lines radial to said wheel and in each row thereof said foils are interconnected with a ring element adjacent their ends which position in use thereof remote from the prevailing wind into which said wheel is faced, and said ring elements serve as means through which said foils may be commonly pivoted in accordance with the force of the prevailing wind, within defined limits.

10. Windmill apparatus as in claim 9 wherein means disposed radially of said wheel-like structure are operatively connected to rotate said ring elements to effect a selected disposition of said operating faces of said bodies.

11. Apparatus as in claim 1 characterized in that said operating face of each said foil faced into the prevailing wind in use of said apparatus has in connection therewith control means which accommodate a pivoting movement of said foil within defined limits wherein the operating face of the foil will form an angle lying in a range between about 10° and about 35°.

12. Windmill apparatus as in claim 11 wherein said control means are constructed and arranged to respond to a predetermined speed of the prevailing winds to which the wheel is subjected in use to cause said foils thereon to simultaneously pivot to dispose their operating faces in a feathered position.

13. Windmill apparatus as in claim 11 wherein said control means include concentric shafts one of which is operatively connected to cause a simultaneous pivoting of said foils on rotation thereof to effect a selected inclination of the operating faces of said foils in their facing relation into the prevailing wind and the other of which is connected to be driven by the rotation of said wheel-like structure under the influence of the impact of the wind on said operating faces of said foils to convert the applied energy to power.

14. Windmill apparatus providing an air foil comprising a body having means defining therefor a pivot axis, the surface portions of said body at the extremities of its pivot axis being substantially flat, the outer peripheral surface of said foil between said extremities being continuous as viewed in profile in a direction transverse to said axis, a substantial portion of the outer peripheral surface portion of said body being flatted to define thereon a section of said continuous peripheral surface defining the operating face of said body which in use thereof normally tends to face into the prevailing wind of its environment, said flatted portion of said peripheral surface being comprised of a pair of distinct planar surface portions one of which leads the other having regard for the facing of the body into the prevailing wind, the trailing planar surface portion of said flatted portion being angled obliquely and outwardly from the leading planar surface portion and, in profile, in a sense transverse to the foil axis, the balance of said peripheral surface being generally arcuate and departing sharply from said flatted portion to give the foil at its side opposite said flatted portion a bulbous configuration the peak of which has a substantial departure from said flatted portion having regards to the length of said flatted portion as viewing the profile of said body in a sense transverse to its pivot axis.

15. Windmill apparatus as in claim 14 characterized in that said profile of said body is relatively short and stubby and distinguished by a length to depth ratio, having regard to the maximum depth of said body in said profile which is not appreciably greater than 2 to 1.

16. Windmill apparatus as in claim 14 including a plurality of said bodies wherein said bodies are arranged in circular rows and in closely spaced following relation to each other in each said row and a frame formed as a wheel mounts said bodies so that said operation faces thereof commonly face into the prevailing wind, means being provided for an initial setting of said operating faces into the wind at a selected angle with respect to said frame providing that a drive of the wheel may be achieved when the impacting wind speed reaches a level of 3 to 5 miles per hour or more and said bodies have means in connection therewith to limit said selected angle and the speed of rotation of said wheel thereby.

17. Windmill apparatus as in claim 16 wherein said bodies in each single row are commonly interconnected for a conjoint adjustment of said angle and thereby the positions of said operating faces with respect to the direction of the prevailing wind.

18. Windmill apparatus as in claim 16 including control means for adjustment of the positions of said bodies within said frame operatively connected with at least one body in each circular row thereof, the bodies in each row being interconnected to provide for their simultaneous adjustment as to the position of said operating faces under the influence of said control means.

19. Windmill apparatus as in claim 18 wherein said control means include means adapted for an automatic response to a need for the adjustment of said bodies operative to produce a movement of said bodies to establish their operating faces at a selected position with respect to said frame.

20. Windmill apparatus as in claim 14 wherein a plurality of said bodies are embodied in a wheel-like frame, arranged in concentric rows, in each row of which said bodies are relatively closely spaced, said bodies being short and stubby in configuration in a sense transversely of their pivot axes, said bodies having in connection therewith means enabled by the movement thereof to an operating position to apply a yielding pressure to maintain said bodies in said operating position, said means applying a yielding pressure being arranged to be disabled automatically in response to a predetermined extent of movement of said bodies from their operating position towards a feathered position.

21. Windmill apparatus as in claim 20 characterized by means provided for moving said bodies to present a selected operating position of said operating faces to the prevailing winds and means responsive to said operating faces of said bodies being impacted by a prevailing wind at a predetermined high speed to move said bodies to a feathered position operative to maintain said bodies in said feathered position.

22. Windmill apparatus according to claim 21 wherein said means to apply a yielding pressure is part of a cocking mechanism including a spring stressed by operation of said moving means to move the operating faces of said bodies to an operating position and relieve the stress responsive to the movement of said bodies a predetermined distance, in a pivotal sense, toward a feathered position.

* * * * *

UNITED STATES PATENT AND TRADEMARK OFFICE
CERTIFICATE OF CORRECTION

PATENT NO. : 4,213,737
DATED : July 22, 1980
INVENTOR(S) : Kyle D. Gerhardt

It is certified that error appears in the above-identified patent and that said Letters Patent are hereby corrected as shown below:

Col. 4, line 35, "the" (first occurrence) is deleted;

line 37, -- the -- is inserted following "axis";

line 44, "substantialy" is corrected to read -- substantially --.

Col. 8, line 56, "priphery" is corrected to read -- periphery --.

Col. 11, line 24, "insured" is corrected to read -- insures --.

Col. 13, line 16 (Claim 7, line 2), "selective" is corrected to read -- selected --;

line 24, (Claim 8, line 4), "to" is corrected to read -- of --.

Col. 14, line 36, (Claim 16, line 5), "operation" is corrected to read -- operating --.

Signed and Sealed this

Twenty-eighth Day of October 1980

[SEAL]

Attest:

SIDNEY A. DIAMOND

*Attesting Officer*    *Commissioner of Patents and Trademarks*